United States Patent [19]

Finn et al.

[11] Patent Number: 4,717,288

[45] Date of Patent: Jan. 5, 1988

[54] FLEX JOINT

[75] Inventors: Lyle D. Finn; Leonard D. Power, both of Houston, Tex.

[73] Assignee: Exxon Production Research Company, Houston, Tex.

[21] Appl. No.: 895,538

[22] Filed: Aug. 13, 1986

Related U.S. Application Data

[63] Continuation-in-part of Ser. No. 756,405, Jul. 17, 1985, abandoned.

[51] Int. Cl.⁴ .......................... E02B 17/00; F16D 3/00
[52] U.S. Cl. ...................................... 405/202; 52/167; 52/726; 403/220; 403/291; 405/204
[58] Field of Search ................... 52/295, 296, 297, 263, 52/167, 726; 267/41, 57, 154, 160; 405/202, 195, 204, 224, 227; 384/2; 403/220, 291

[56] References Cited

U.S. PATENT DOCUMENTS

| | | | |
|---|---|---|---|
| 3,063,670 | 11/1962 | Young | 267/160 X |
| 3,203,739 | 8/1965 | Young | 267/160 X |
| 3,246,890 | 4/1966 | Ormond | 267/160 X |
| 3,283,515 | 11/1966 | Pottorf | 405/211 |
| 3,626,701 | 12/1971 | Laffont | 405/202 |
| 3,636,716 | 1/1972 | Castellanos | 405/202 |
| 3,735,597 | 5/1973 | Guy | 405/202 |
| 3,743,268 | 7/1973 | Heikind et al. | 267/160 |
| 4,170,431 | 10/1979 | Wood | 405/202 |
| 4,231,682 | 11/1980 | Tuson | 405/202 |
| 4,273,470 | 6/1981 | Blomsma et al. | 405/202 |
| 4,337,970 | 7/1982 | Gunderson | 285/136 |
| 4,363,567 | 12/1982 | Van der Graaf | 405/195 |
| 4,378,179 | 3/1983 | Hasle | 405/227 |
| 4,417,831 | 11/1983 | Abbott et al. | 405/227 |
| 4,519,725 | 5/1985 | Mott et al. | 405/195 |
| 4,610,569 | 9/1986 | Finn et al. | 405/202 |
| 4,640,640 | 2/1987 | Herrington | 403/291 X |

FOREIGN PATENT DOCUMENTS 2066336A 7/1981 United Kingdom .
2123883A 2/1984 United Kingdom .

OTHER PUBLICATIONS

Finn, L. D., "A New Deep-Water Platform-The Guyed Tower", Journal of Petroleum Technology, Apr. 1978, pp. 537-544.

Handbook of Mechanical Design, by George F. Nordenholt, Joseph Kerr, and John Sasso, McGraw-Hill Book Company, Inc., 1942, pp. 154 to 156.

Primary Examiner—David H. Corbin
Attorney, Agent, or Firm—Keith A. Bell

[57] ABSTRACT

A flexible structural joint of "flex joint" for use in an articulated structure is disclosed. The articulated structure has a first section and a second section which are located along a longitudinal axis of the structure, the first section being subject to lateral or transverse loads. The flex joint is located between the first and second sections and accommodates lateral pivoting of the first section with respect to the second section through elastic flexing or bending of certain of its members. No moving parts are used. In a first embodiment, the flex joint consists of an elongated axial load member and at least three shear and torsion links oriented so as to lie substantially in a plane perpendicular to the longitudinal axis of the structure. Each of the links is connected at one of its ends to the first section and at its other end to the second section. In a second embodiment of the invention, four shear and torsion links are joined to form a shear and torsion frame which lies in a plane that is substantially perpendicular to the longitudinal axis of the structure. The frame is connected to the first section of the structure at the opposite ends of a first diametral line lying in the plane of the frame. Similarly, the frame is connected to the second section of the structure at the opposite ends of a second diametral line lying in the plane of the frame. Preferably, the first and second diametral lines are substantially mutually perpendicular.

44 Claims, 13 Drawing Figures

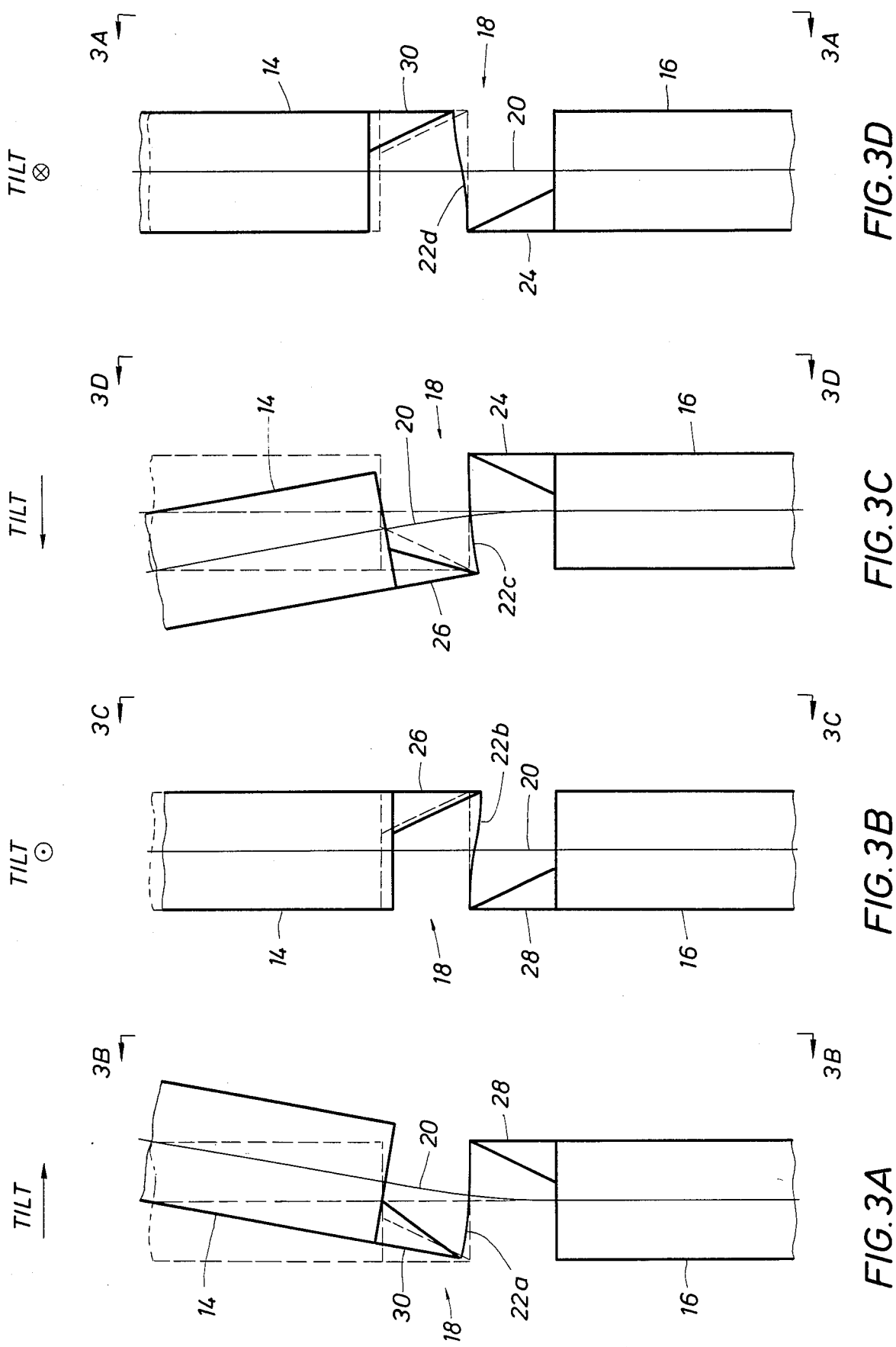

FIG.5
FIG.6
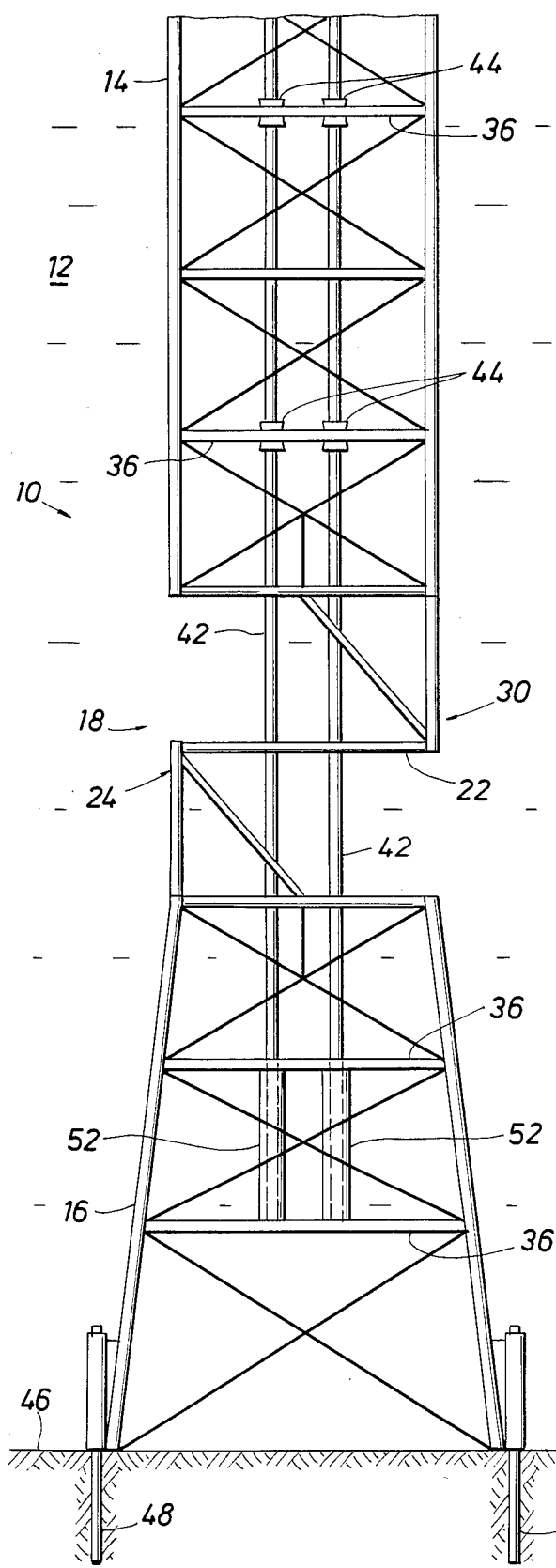
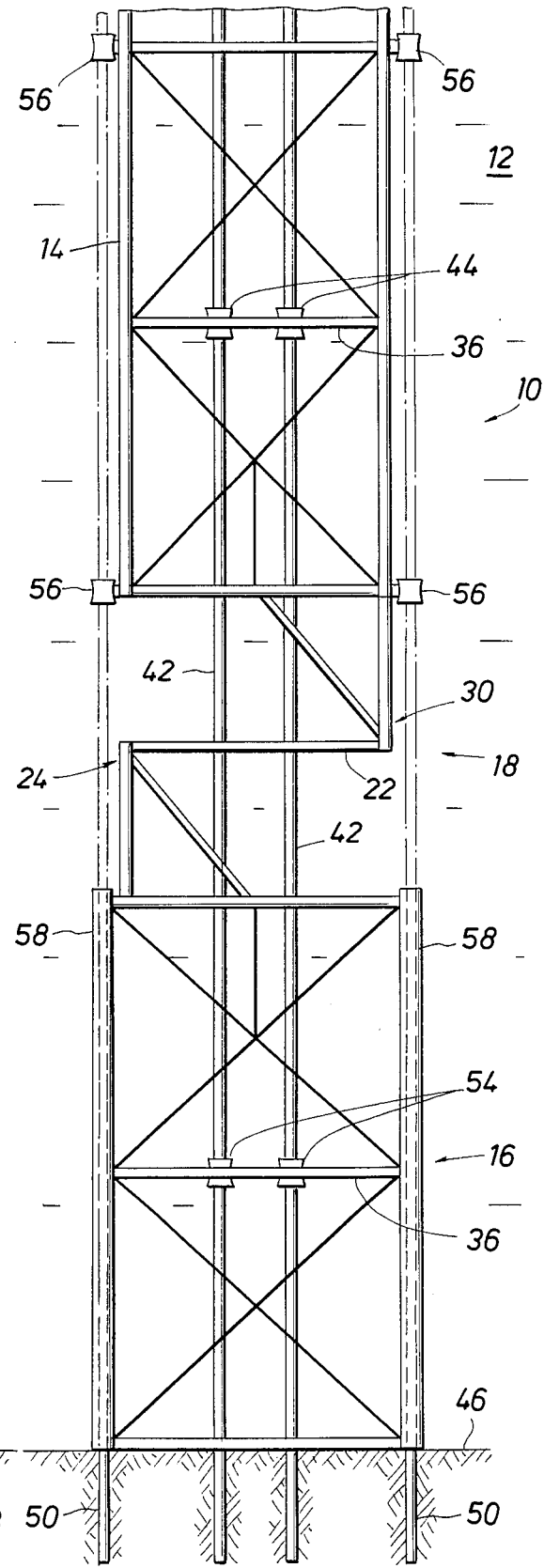

FLEX JOINT

CROSS REFERENCE TO RELATED APPLICATION

This application is a continuation-in-part of patent application Ser. No. 756,405, filed July 17, 1985, now abandoned.

FIELD OF THE INVENTION

The invention relates to a flexible structural joint for use in an articulated structure subject to transverse loads. More particularly, the invention pertains to a flex joint for use in an articulated offshore structure.

BACKGROUND OF THE INVENTION

Since its beginnings in the late 1940's, the offshore petroleum industry has been moving into progressively deeper waters. Until recently, offshore petroleum drilling and producing operations typically have been conducted from rigid, bottom-founded offshore structures such as conventional steel jacket structures or concrete or steel gravity structures. Such structures are designed to rigidly resist environmental forces such as wind, waves, and ocean currents. However, in waters deeper than about 1,000 feet, the steel tonnage, and hence the cost, required to rigidly resist environmental forces increases so rapidly that an economic limit is soon reached, even given the most favorable economic conditions.

Water depths of interest to the offshore petroleum industry have now increased to the point where rigid, bottom-founded offshore structures are, in many cases, no longer technically or economically feasible. This problem has resulted in the development of new types of offshore structures generally known as "compliant towers". Compliant towers are offshore structures that do not rigidly resist environmental forces. Rather a compliant tower is designed to yield to the environmental forces in a controlled manner. Basically, the tower is allowed to oscillate a few degrees from vertical about its base in response to the applied environmental forces. This oscillation, which may be characterized as that of an inverted pendulum, creates an inertial restoring force which opposes the applied environmental forces.

One such compliant tower is the "guyed tower". Basically, a guyed tower is a trussed structure of generally uniform cross-section that extends upwardly from the bottom of the body of water to a deck supported above the water surface. The structure is held upright by an array of guy lines which are spaced around the periphery of the structure and radiate outwardly and downwardly to anchor points located on the bottom of the body of water. The guy lines permit the tower to pivot laterally a few degrees about its base in response to surface wind, wave, or current forces. See generally, Finn, L. D., "A New Deep-Water Platform—The Guyed Tower", Journal of Petroleum Technology, April 1978, pp. 537–544.

A second type of compliant tower is the "buoyant tower". Basically, a buoyant tower is a trussed structure similar to a guyed tower; however, no guy lines are used. The entire restoring force for the structure is provided by large buoyancy tanks located on the structure, preferably at or near the surface of the body of water. See, for example, the buoyant tower illustrated in U.S. Pat. No. 3,636,716 issued Jan. 25, 1972 to Castellanos.

Yet another type of compliant tower, the "hybrid tower", is disclosed in U.S. Pat. No. 4,610,569 issued Sept. 9, 1986 and entitled "Hybrid Offshore Structure". Basically, a hybrid tower comprises a compliant upper section such as a guyed tower or a buoyant tower mounted on a rigid, bottom-founded lower section. As more fully described in the referenced patent application, the compliant upper section is permitted to pivot laterally a few degrees about a pivot point located at or near the upper end of the lower section in response to the applied environmental forces.

The compliant towers described above are generally designed for use as petroleum drilling and producing platforms. Another type of articulated offshore structure is the "single anchor leg mooring" or "SALM" which is used to transfer hydrocarbon products from the bottom of a body of water to a floating storage facility or tanker. Basically, a SALM is a riser pipe extending from a base located on the bottom of the body of water to a mooring buoy located on the surface of the body of water. A floating storage facility or tanker is moored to the mooring buoy and is allowed to "weathervane" about the buoy in response to environmental forces. Typically, a SALM is articulated or jointed at both the bottom and the top of the riser pipe. Hydrocarbon product flowlines extend from the base through the articulated joints, riser pipe, and mooring buoy to the floating storage facility or tanker. See, for example, the SALM illustrated in FIG. 1 of U.S. Pat. No. 4,337,970 issued July 6, 1982 to Gunderson.

Each of the articulated offshore structures described above requires the use of an articulated joint or pivot which will permit the desired lateral pivoting movement. Typically, the articulated joint or pivot must also be capable of transmitting large vertical loads between adjacent sections of the structure. Generally, the articulated joint or pivot is located near the bottom of the structure; however, as noted above, a SALM is typically articulated or jointed at both the bottom and the top of the riser pipe.

As an added complication, articulated offshore structures typically require use of a means to transmit torsional loads between adjacent sections of the structure. Offshore structures are seldom, if ever, perfectly symmetrical. Wind, waves, and ocean currents impinging on an asymmetrical structure create uneven forces which tend to twist the structure about its vertical axis. These twisting forces must be transmitted to and resisted by the foundation of the structure in order to prevent damage to or destruction of the flow lines, well conductors, and other components of the structure.

Heretofore, a variety of mechanical devices, such as universal joints and ball joints, have been proposed for use as articulated joints or pivots in articulated offshore structures. Use of a universal joint has the benefit of combining the articulated joint or pivot and the torsion means. See, for example, FIG. 10 of U.S. Pat. No. 3,626,701 issued Dec. 14, 1971 to Laffont. Use of a ball joint as the pivot requires use of a separate torsion means. See, for example, the hinge disclosed in U.S. Pat. No. 3,735,597 issued May 29, 1973 to Guy. Other types of mechanical pivots have also been proposed for use in articulated offshore structures. See, for example, U.S. Pat. No. 3,636,716 issued Jan. 25, 1972 to Castellanos and U.S. Pat. No. 4,231,632 issued Nov. 4, 1980 to Tuson.

The mechanical devices previously proposed for use as articulated joints or pivots in articulated offshore structures typically incorporate moving parts which are subject to wear and must be maintained over the life of the structure. In deep waters, maintenance of such devices is, at best, extremely difficult and expensive. Repair or replacement of such devices may be a practical impossibility. For large structures, or structures in deep waters, the loads which must be transmitted by such devices are so great that commonly used mechanical joints or pivots are impractical. Further, use of a mechanical joint or pivot typically requires that loads be transmitted through a single point which has no redundancy.

Accordingly, the need exists for a pivot or joint suitable for use in an articulated offshore structure which has no moving parts, is capable of transmitting large loads, is capable of providing redundancy, and requires little or no maintenance over the life of the structure.

SUMMARY OF THE INVENTION

The present invention is a flexible structural joint or "flex joint" for use in an articulated structure. The structure has a first section and a second section which are located along a longitudinal axis of the structure. The first section is subject to lateral or transverse loads. It is desired to permit the first section to pivot laterally with respect to the second section in response to such lateral or transverse loads.

The flex joint of the present invention accommodates the desired lateral pivoting of the first section through elastic flexing or bending of certain of its members. No moving parts are used.

In a first embodiment, the flex joint consists of an axial load member attached to the first and second sections of the structure and at least three elongated shear and torsion links located between the first and second sections and oriented so as to lie substantially in a plane perpendicular to the longitudinal axis of the structure. Each of the shear and torsion links is connected at one of its ends to the first section of the structure and at its other end to the second section of the structure.

Preferably, the axial load member is an elongated tubular member which is substantially coincident with the longitudinal axis of the structure. The axial load member is capable of transmitting all longitudinal loads between the first and second sections of the structure. The axial load member bends to accommodate lateral pivoting of the first section. Thus, the axial load member functions essentially in the manner of a long columnar or bar spring. The stiffness of the axial load member may be easily varied by changing either or both of its flexural rigidity and the unsupported length subject to bending. The axial load member may be either a single tubular element or a plurality of concentric tubular elements each of which is attached to both the first and second sections of the structure. Alternatively, the axial load member may be a closely-spaced cluster of tubular elements grouped around the longitudinal axis of the structure.

The shear and torsion links elastically flex or bend to accommodate lateral pivoting of the first section. So long as the maximum stress in a given link does not exceed the elastic limit of the structural material, the link will return to its undeflected position when the applied load is released. The links are also capable of transmitting all shear and torsion loads between the first and second sections.

In a second embodiment of the invention, four shear and torsion links are joined to form a substantially planar shear and torsion frame located between the first and second sections of the structure. The frame lies in a plane substantially perpendicular to the longitudinal axis of the structure. Preferably, the frame is square in shape; however, other planar shapes may also be used. The geometric center of the frame is preferably located at or near the longitudinal axis of the structure.

A first pair of support members are used to connect the shear and torsion frame to the first section of the structure. Preferably, the first pair of support members are attached, respectively, to diametrically opposite points on the frame. In other words, the first pair are attached to the frame at opposite ends of a first diametral line lying in the plane of the frame and passing substantially through the geometric center of the frame. A second pair of support members are used to connect the shear and torsion frame to the second section of the structure. The second pair of support members are attached to the frame at opposite ends of a second diametral line lying in the plane of the frame. Preferably, the first and second diametral lines are substantially mutually perpendicular. In the case of a square shear and torsion frame, the four support members are preferably connected at the four corners of the frame, and the first and second diametral lines are diagonal lines connecting opposite corners of the frame.

The shear and torsion frame elastically flexes or bends to accommodate lateral pivoting of the first section of the structure. Torsional and shear loads on the first section are transmitted by the first pair of support members to the shear and torsion frame and thence by the second pair of support members to the second section.

Multiple flex joints may be used to accommodate large angle deflections of the first section. It may be desirable to provide means for limiting the maximum deflection of each individual joint to prevent harmful overstressing thereof.

In an alternate embodiment, a second shear and torsion frame is used to add desirable redundancy to the flex joint. The second frame is smaller than the first frame and lies in the same plane as the first frame. Preferably, the geometric centers of the first and second frames are substantially coincident. The second frame is connected to the first and second sections of the structure in the same manner as described above for the first frame and the connection points for the second frame preferably lie on the same diametral lines as the connection points for the first frame; however, the direction of support at a given connection point on the second frame is opposite to that of the corresponding connection point on the first frame. For example, if the first frame is connected to the first section at a given connection point, the second frame would be connected to the second section at the corresponding connection point.

BRIEF DESCRIPTION OF THE DRAWINGS

The actual operation and advantages of the present invention will be better understood by referring to the following detailed description and the attached drawings in which:

FIGS. 3A through 3D are single-line elevational sketches illustrating, respectively, the deflection of each of the four side members of the shear and torsion frame for a given direction of tilt;

FIGS. 5 and 6 are elevational views illustrating an embodiment of the present invention which uses a closely-spaced cluster of elongated tubular elements as the axial load member;

FIG. 9 is a perspective view illustrating one corner of the shear and torsion frame and the associated support member and FIG. 10 is an exploded perspective view of an embodiment of the invention wherein the shear and torsion frames are connected directly to the trussing of the upper and lower sections.

While the invention will be described in connection with the preferred embodiments, it will be understood that the invention is not limited to such embodiments. On the contrary, it is intended to cover all alternatives, modifications, and equivalents which may be included within the spirit and scope of the invention.

DETAILED DESCRIPTION OF THE PREFERRED EMBODIMENTS

The present invention provides a flexible structural joint or "flex joint" that is suitable for use in an articulated structure, has no moving parts, can easily transmit large loads, is capable of providing redundancy, and requires little or no maintenance throughout the life of the structure. These and other advantages of the invention will be apparent from the following detailed description. It should be noted that although the invention will be described in connection with an articulated offshore structure, it is also suitable for use in other types of articulated structures. Accordingly, all such uses are intended to be within the scope of the invention.

Figure 1:
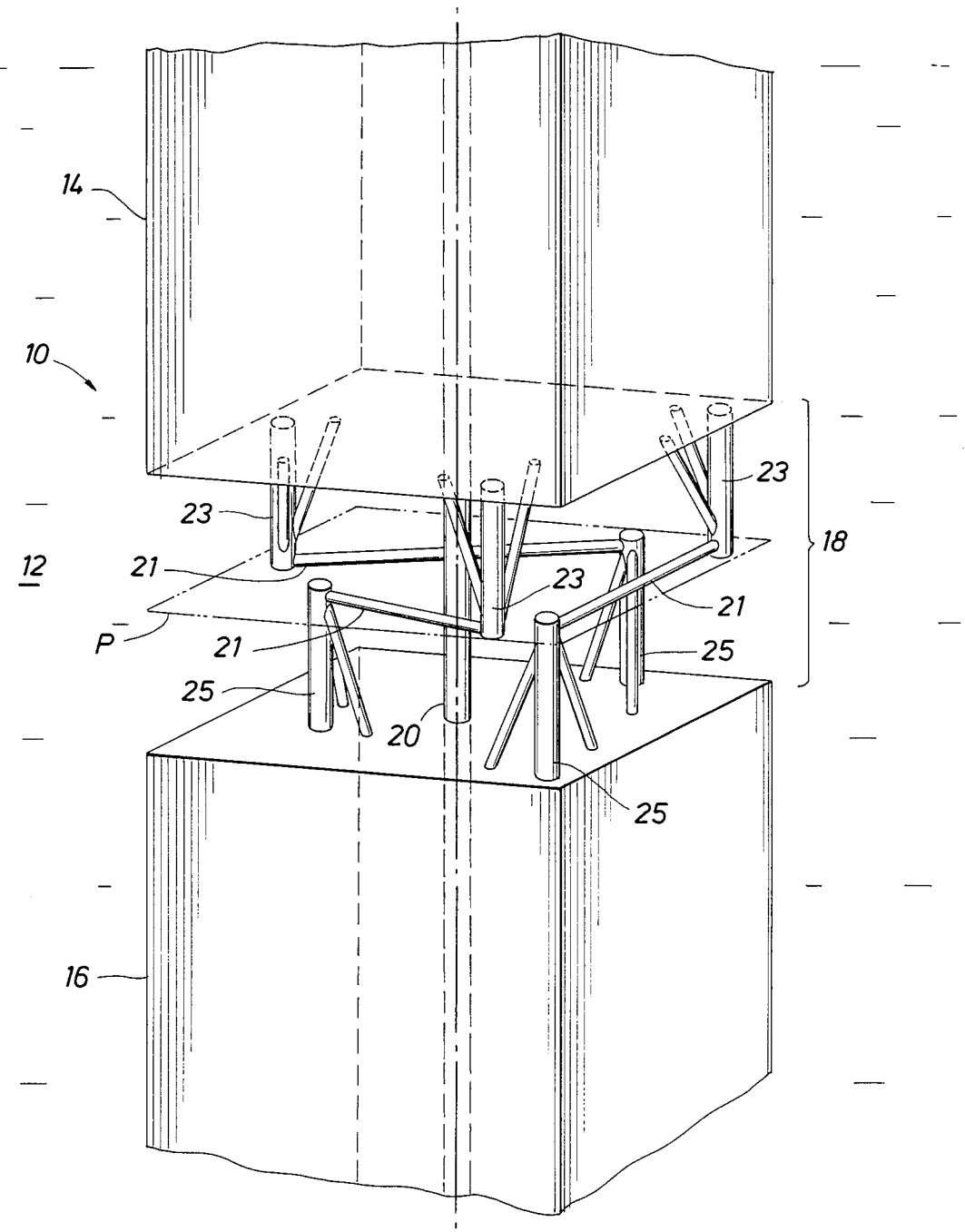
FIG. 1 is a perspective view illustrating the principal components of a first embodiment of the invention.

Turning now to FIG. 1, an offshore structure 10 located in a body of water 12 and having an upper section 14 and a lower section 16 is illustrated. Upper section 14 and lower section 16 are shown in block form for simplicity and ease of understanding. However, in actual practice it is likely that upper section 14 and lower section 16 would consist of trussed frameworks, as is well known in the art. Alternatively, upper section 14 and lower section 16 may be any other type of structure, such as a riser pipe in a SALM. Upper section 14 extends upwardly toward the surface (not shown) of body of water 12. Lower section 16 extends downwardly toward the bottom (not shown) of body of water 12. Lower section 16 may be the base of structure 10 and have a height of only a few feet. Alternatively, lower section 16 may be the lower section of a hybrid tower or the riser pipe of a SALM and, accordingly, have a height of several hundred feet. Upper section 14 is subject to transverse loads resulting from wind, waves, and currents. It is desired to permit upper section 14 to pivot laterally with respect to lower section 16 in response to such transverse loads.

The desired lateral pivoting of upper section 14 is accommodated by the flex joint, generally indicated at 18, of the present invention. As will be hereinafter described in greater detail, flex joint 18 accommodates lateral pivoting of upper section 14 through elastic flexing or bending of certain of its members. Flex joint 18 is also capable of transmitting all shear and torsional loads from upper section 14 to lower section 16. As illustrated in FIG. 1, flex joint 18 consists of an axial load member 20 and at least three elongated shear and torsion links 21. Each of the links 21 is connected at one of its ends to upper section 14 by a first support member 23 and at its other end to lower section 16 by a second support member 25. Preferably, the links 21 and the support members 23 and 25 are constructed from steel tubulars of the type generally used for the trusswork of an offshore structure. Other types of structural elements may also be used, if desired.

FIG. 1 illustrates a plane "P" located between upper section 14 and lower section 16. Plane "P" is substantially perpendicular to the vertical axis (longitudinal centerline) of structure 10. Preferably, each shear and torsion link 21 is oriented so that its longitudinal centerline lies substantially in plane "P"; however, if desired, one or more of the links 21 may be inclined to plane "P" at an angle of up to about 15°.

The three shear and torsion links 21 may be of equal or unequal lengths, as desired. Further, no particular orientation of the links 21 within plane "P" is necessary; however, preferably, no more than two of the three links 21 should be collinear. The links 21 may be located either inside or outside of the perimeter of structure 10, and the support members 23 and 25 for a given link 21 may be interchanged, as desired. In a preferred embodiment of the invention, the three shear and torsion links 21 would be of substantially equal lengths and would be oriented along the sides of an equilateral triangle located substantially in plane "P".

Preferably, axial load member 20 is an elongated tubular member that is substantially coincident with the vertical axis (longitudinal centerline) of structure 10. However, if desired, axial load member 20 may be laterally offset from the vertical axis. As will be hereinafter described in greater detail, axial load member 20 is attached to both upper section 14 and lower section 16 and is capable of transmitting vertical (longitudinal) loads therebetween.

The function of support members 23 and 25 is to facilitate the attachment of the shear and torsion links 21 to the upper and lower sections, respectively.

As illustrated in FIG. 1, support members 23 and 25 comprise trusses constructed from steel tubulars, each of which has a substantially vertical center column and two angled braces. Other suitable support members will be apparent to those skilled in the art. Alternatively, the shear and torsion links may be attached directly to the upper and lower sections thereby eliminating the need for spearate and discrete support members.

Figure 2:
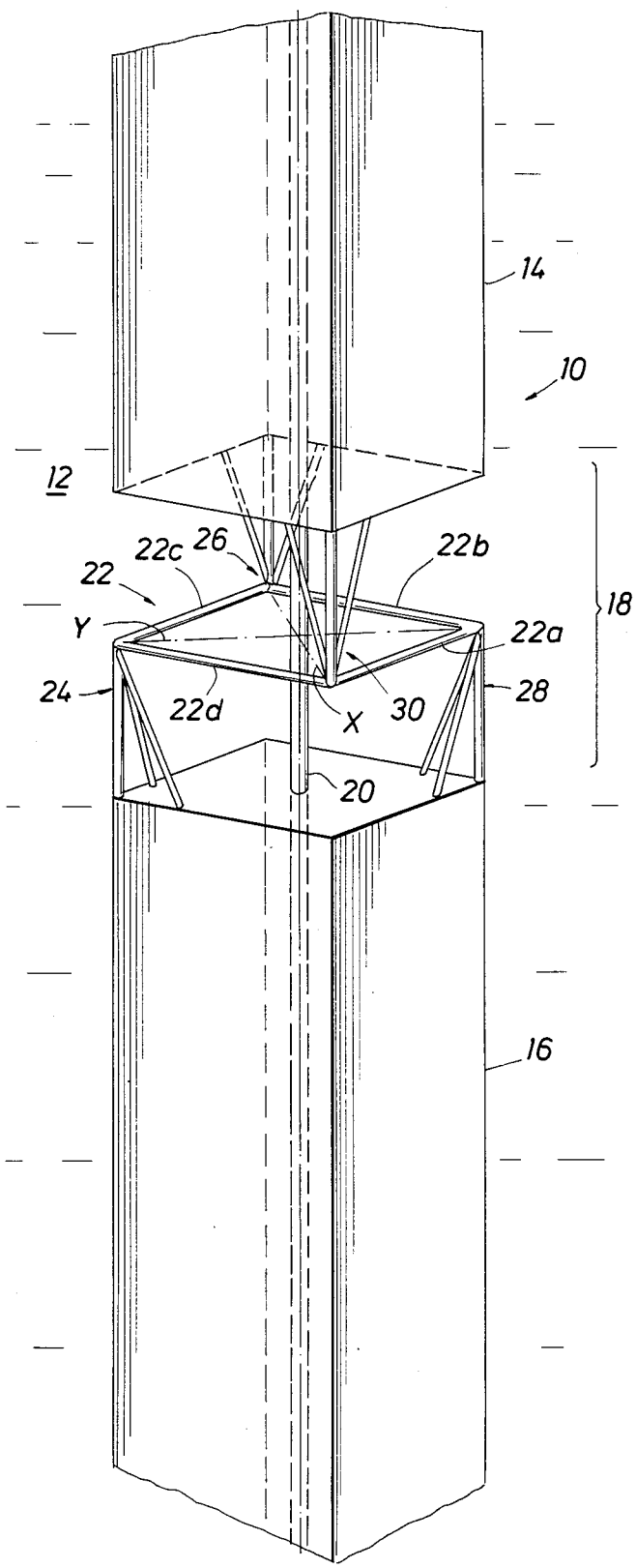
FIG. 2 is a perspective view illustrating the principal components of a second embodiment of the invention.

FIG. 2 illustrates a second embodiment of the invention in which four shear and torsion links 22a, 22b, 22c, and 22d are joined to form a substantially planar shear and torsion frame 22. The remainder of the description of the invention will be directed toward the embodiment illustrated in FIG. 2 and certain variations thereof.

Shear and torsion frame 22 is located between upper section 14 and lower section 16 and, preferably, lies in a plane that is substantially perpendicular to the vertical axis of structure 10. Preferably, the geometric center of frame 22 is located at or near the vertical axis (longitudinal centerline) of structure 10. As illustrated in FIG. 2, frame 22 comprises a square frame; however, other planar shapes may also be used. Preferably, frame 22 is constructed from steel tubulars of the type generally used for the trusswork of an offshore structure; however, other types of structural elements may also be used.

Shear and torsion frame 22 is attached to upper section 14 by support members 26 and 30 and to lower section 16 by support members 24 and 28. Support members 26 and 30 are attached, respectively, to frame 22 at opposite ends of diametral line "X". As used herein and in the claims, "diametral line" means a line segment lying in the plane of the frame which passes substantially through the geometric center of the frame and connects diametrically opposite points on the frame. Support members 24 and 28 are attached, respectively, to frame 22 at opposite ends of diametral line "Y". Preferably, diametral lines "X" and "Y" are substantially mutually perpendicular. In the case of a square shear and torsion frame, as illustrated in FIG. 2, the preferred support points are the four corners of the frame and diametral lines "X" and "Y" are diagonal lines connecting opposite corners.

As illustrated in FIG. 2, frame 22 is supported at four points spaced around its periphery with the direction of support alternating from point to point. Thus, as with the embodiment illustrated in FIG. 1, each of the individual side members 22a, 22b, 22c, and 22d is connected at one of its ends to upper section 14 and at its other end to lower section 16.

Referring now to FIGS. 3A through 3D, the manner in which shear and torsion frame 22 flexes or bends to accommodate lateral pivoting of upper section 14 will be described. FIGS. 3A through 3D are elevational one-line sketches, respectively, of the deflection of the four side members 22a, 22b, 22c, and 22d of frame 22 for a given direction of tilt. The direction of tilt is indicated at the top of each sketch. The deflection of upper section 14 has been exaggerated for purposes of illustration. Typically, the maximum deflection of upper section 14 will not exceed a few degrees. The undeflected positions of upper section 14, axial load member 20, the relevant support member 26 or 30, and the relevant side member 22a, 22b, 22c, or 22d of frame 22 are indicated by dashed lines and the deflected positions by solid lines. As illustrated in FIG. 3A, for the indicated direction of tilt, side member 22a is elastically flexed or bent upwardly in a single smooth curve. As illustrated in FIGS. 3B through 3D, for the same direction of tilt, side member 22b is elastically flexed downwardly in a double curve, side member 22c is elastically flexed downwardly in a single curve, and side member 22d is elastically flexed upwardly in a double curve.

For simplicity, the direction of tilt illustrated in FIGS. 3A through 3D was assumed to be perpendicular to side members 22b and 22d of frame 22. In actual practice the direction of tilt is likely to be oblique to each of the side members of frame 22 (or to the individual shear and torsion links 21 in the embodiment illustrated in FIG. 1). However, the deflection of side members 22a, 22b, 22c, and 22d (or links 21) for any direction of tilt may be determined by resolving the applied load into its orthogonal components and adding the deflections resulting from each component. So long as the maximum bending stress in each of the side members 22a, 22b, 22c, and 22d (or the links 21) does not exceed the elastic limit of the structural material, the side members (or links) will return to their undeflected positions when the applied load is released.

Support members 24, 26, 28, and 30 are rigidly attached (e.g., by welding or bolting) to shear and torsion frame 22 and to upper section 14 or lower section 16, whichever is applicable. Preferably, the connection between each individual support member and frame 22 should be designed to minimize stress concentrations (and, therefore, fatigue). FIG. 9 illustrates one possible design for the connection between support member 30 and the corner of frame 22 formed by side members 22a and 22d. As illustrated, support member 30 consists of a substantially vertical center column 30a and two angled braces 30b and 30c. Typically, the center column 30a would have a larger diameter than either the side members 22a and 22d or the braces 30b and 30c. The joints between the various structural elements are welded. Other possible connection designs will be apparent to those skilled in the art. For example, as more fully described in connection with FIG. 10, frame 22 may simply be connected directly to the trussing of the upper and lower sections.

As described above, shear and torsion frame 22 and support members 24, 26, 28, and 30 are capable of transmitting to lower section 16 all loads resulting from lateral pivoting of upper section 14. These loads are primarily transmitted through bending or flexing of the individual side members 22a, 22b, 22c, and 22d of frame 22, as illustrated in FIGS. 3A through 3D. As will be apparent to those skilled in the art, frame 22 and support members 24, 26, 28, and 30 are also capable of transmitting to lower section 16 all torsional loads resulting from twisting of upper section 14 about its vertical (longitudinal) axis. These torsional loads are transmitted by support members 26 and 30 to frame 22 and thence by support members 24 and 28 to lower section 16. However, due to the unique method of supporting frame 22, described above, frame 22 is not capable of transmitting large vertical (longitudinal) loads between upper section 14 and lower section 16. Large vertical loads applied to frame 22 through support members 26 and 30 would cause excessive bending in side members 22a, 22b, 22c, and 22d, thereby damaging or destroying frame 22. Accordingly, means must be provided for transmitting vertical loads between upper section 14 and lower section 16 and for isolating frame 22 from the harmful effects thereof. Further, such means for transmitting vertical loads should not excessively interfere with the flexing of joint 18.

Axial load member 20 satisfies the foregoing criteria. Member 20 is attached to both upper section 14 and lower section 16 and is capable of transmitting all vertical (longitudinal) loads therebetween. As noted above, member 20 is preferably an elongated tubular member that is substantially coincident with the vertical axis of structure 10. For purposes of the following discussion, the vertical axis of structure 10 will be assumed to be coincident with the neutral bending axis of structure 10 for any given direction of tilt. Therefore, as illustrated in FIGS. 3A and 3C, member 20 will be placed in simple bending by lateral pivoting of upper section 14. Thus, member 20 functions essentially as a long columnar or bar spring and will not excessively interfere with the flexing of joint 18. The stiffness of member 20 will be primarily dependent on its flexural rigidity and the unsupported length being subjected to bending.

Figure 4:
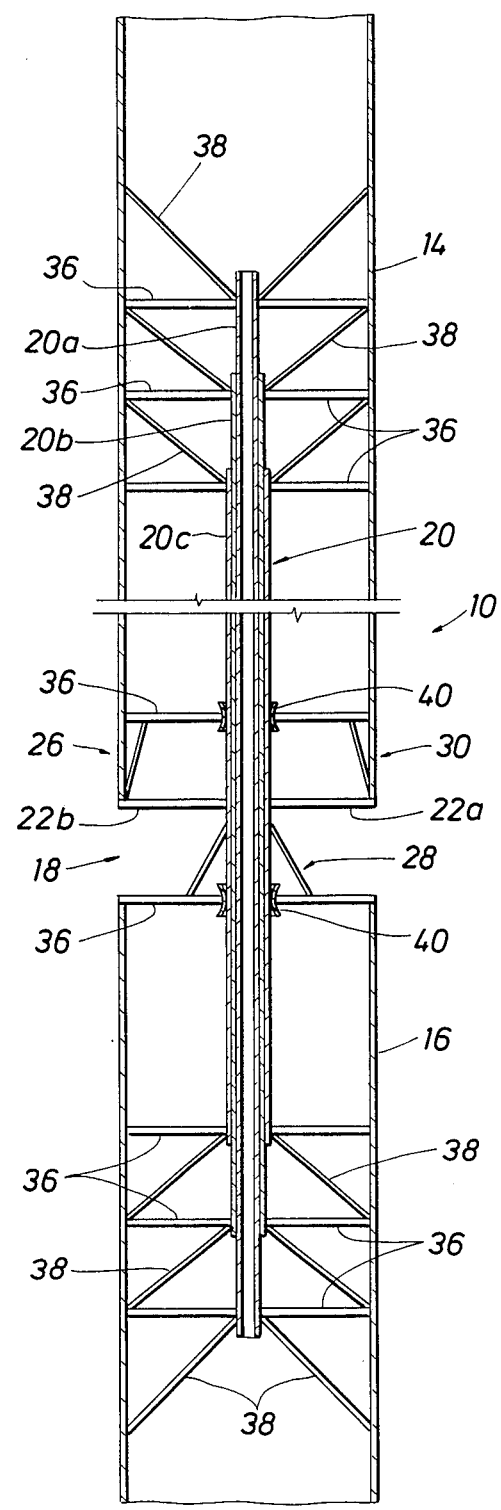
FIG. 4 is an elevational view, in partial section, taken along a diagonal line of the structure and illustrating one embodiment of the axial load member of the present invention.

Axial load member 20 may be a single tubular element of the type commonly used in offshore structures. Alternatively, to add desirable redundancy, member 20 may consist of a plurality of concentric tubular members, as illustrated in FIG. 4. FIG. 4 is a cross-sectional view of structure 10 taken along a diagonal line such as diametral line "X" (see FIG. 2). In FIG. 4, member 20 consists of three concentric tubular members 20a, 20b, and 20c which are terminated at different levels above and below joint 18. Tubular member 20a is the longest of the three concentric tubular members. Tubular member 20b is shorter than tubular member 20a and fits loosely thereover so that tubular member 20a extends beyond the upper and lower ends of tubular member 20b. Tubular member 20c is the shortest of the three concentric tubular members and fits loosely over tubular member 20b so that both tubular members 20a and 20b extend beyond the upper and lower ends of tubular member 20c. The upper and lower ends of the three concentric tubular members are welded or otherwise attached, respectively, to the trusswork (e.g., horizontal beam members 36 and angled brace members 38) of upper section 14 and lower section 16.

Guides 40 are rigidly attached to the lower end of upper section 14 and the upper end of lower section 16. Axial load member 20 extends through and is guided by guides 40. If desired, additional guides (not shown) may be attached to upper section 14 and lower section 16 and spaced along the length of member 20. The guides 40 permit axial load member 20 to spread its bending over a long distance and, therefore, reduce the bending stress in member 20.

As noted above, the stiffness of axial load member 20 is primarily dependent on its flexural rigidity and the unsupported length being subjected to bending. Thus, the stiffness may be easily varied by varying the locations at which member 20 is attached to upper section 14 and lower section 16. For example, member 20 may be attached to upper section 14 only at or near its upper end. In this case, the unsupported length of member 20 would be quite large and the stiffness of member 20 would be quite low. Alternatively, member 20 may be attached to upper section 14 near its lower end in which case the stiffness of member 20 would be substantially higher.

Turning now to FIGS. 5 and 6, an alternate embodiment of the axial load member will be described. As illustrated in FIGS. 5 and 6, the axial load member comprises a plurality of main piles 42 (two shown). Main piles 42 may be single tubular elements or concentric tubulars, as described above in connection with FIG. 4. Preferably, each main pile 42 is attached to upper section 14 only at or near the upper end of upper section 14. Main piles 42 extend downwardly through a series of main pile guides 44 spaced along the length of upper section 14. Main pile guides 44 are rigidly attached to horizontal beam members 36 which form part of the trusswork of upper section 14.

Lower section 16 may be a frustum shaped trussed structure as illustrated in FIG. 5 or a constant-width trussed structure as illustrated in FIG. 6. In either case, lower section 16 is rigidly fixed to the bottom 46 of body of water 12 by piles 48 (FIG. 5) or 50 (FIG. 6). Alternatively, lower section 16 may be a gravity base, as is well known in the art. Main piles 42 may be attached to lower section 16 in the manner previously described in connection with FIG. 4. Alternatively, as illustrated in FIG. 5, a plurality of main pile sleeves 52 may be rigidly attached to the trusswork of lower section 16. Main pile sleeves 52 are located so as to be vertically aligned, respectively, with each of the main piles 42. The lower ends of main piles 42 extend into main pile sleeves 52 and are grouted or otherwise fixed therein. In another embodiment, illustrated in FIG. 6, main piles 42 are not attached to lower section 16. Rather, main piles 42 pass through one or more additional main pile guides 54 attached to the trusswork of lower section 16 and extend into the bottom 46 of body of water 12. In this embodiment, vertical loads are transmitted by main piles 42 directly from upper section 14 to the bottom 46 of body of water 12.

In the embodiment of the invention illustrated in FIGS. 5 and 6, it is likely that a cluster of main piles 42 would be used to provide desirable redundancy. Such a cluster might include as many as eight or more main piles 42. In this embodiment, the stress in any individual main pile will be dependent on the section modulus of the entire cluster. Accordingly, the cluster of main piles should be grouped as closely as possible around the vertical axis of structure 10 so that no individual axial load member will be excessively loaded by flexing of joint 18. As upper section 14 pivots laterally, some of the main piles 42 will be placed in tension while others will be placed in compression. However, since main piles 42 are quite long, the resulting tensile and compressive forces should not be excessive.

The embodiment illustrated in FIG. 6 includes additional pile guides 56 attached to the outside of upper section 14. During launch and upending of structure 10, piles 50 are retracted to the position indicated by dashed lines and are secured to both upper section 14 and lower section 16. This will prevent harmful overflexing of joint 18 during launch and upending of structure 10. After structure 10 has been positioned on the bottom 46 of body of water 12, piles 50 are driven through legs 58 into bottom 46 thereby releasing joint 18 and securing structure 10 to bottom 46. Other means for temporarily securing joint 18 during launch and upending of structure 10 will be apparent to those skilled in the art.

Figure 7:
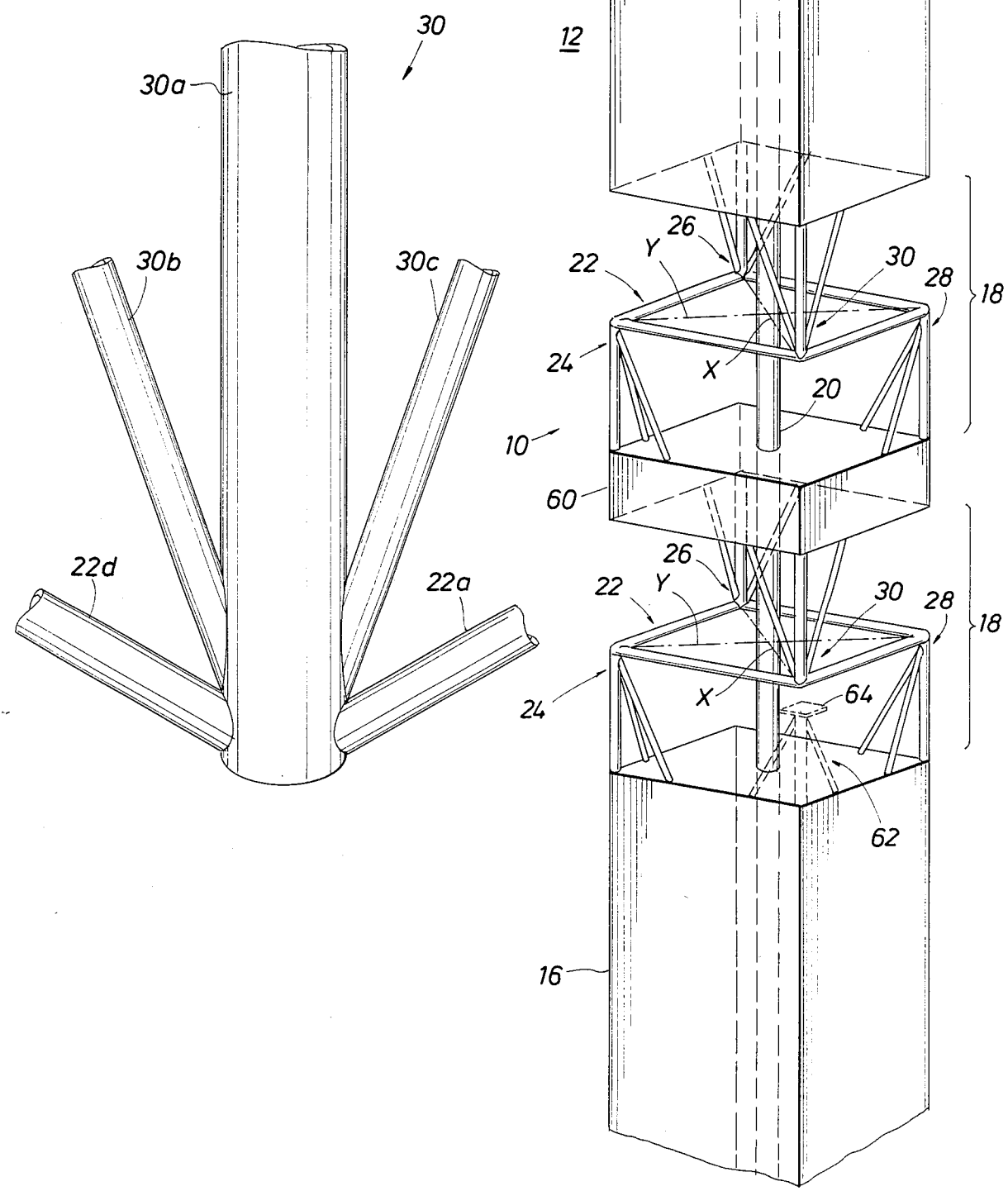
FIG. 7 is a perspective view of an embodiment of the present invention in which multiple shear and torsion frames are used to increase the maximum allowable angle of tilt.

FIG. 7 illustrates an embodiment of the invention in which multiple shear and torsion frames (two shown) are used to increase the maximum allowable angle of tilt of upper section 14 with respect to lower section 16. As illustrated in FIG. 7, structure 10 consists of upper section 14, lower section 16, and a middle section 60. Two flex joints 18 are located, respectively, between upper section 14 and middle section 60 and between middle section 60 and lower section 16. Each of the flex joints 18 consists of a shear and torsion frame 22 and four supports 24, 26, 28, and 30 as described above in connection with FIG. 2. Axial load member 20 extends through upper section 14, middle section 60, and lower section 16 and is attached to upper section 14 and lower section 16 as previously described. Preferably, middle section 60 includes one or more guides (not shown) of the type illustrated in FIG. 4 to guide member 20.

The embodiment illustrated in FIG. 7 will permit larger angles of tilt than is possible using a single flex joint 18. Several joints may be used if desired. As illustrated in FIG. 7, each of the joints has the same angular orientation; however, this is not necessary. In other words, each of the joints 18 may be rotated about the vertical axis of structure 10 to any position such that the corresponding support members (e.g., support members 24) in each joint are not vertically aligned.

In order to prevent harmful overstressing of flex joint 18 (in any of the embodiments described herein), it may be desirable to provide means for limiting the maximum allowable angle of tilt of each individual joint. One suitable means is the mechanical stop 62 located below support member 30 of the lower flex joint 18 in FIG. 7 (illustrated in dashed lines). As illustrated, mechanical stop 62 consists of a three-legged truss having a plate 64 attached to its upper end. Similar mechanical stops (not shown) would be located below support member 26 and above support members 24 and 28. The plates 64 are located a distance below or above frame 22, as appropriate. The maximum allowable deflection of frame 22 (and, therefore, the maximum allowable bending stress in the individual side members of frame 22) will be governed by the distance between the frame 22 and the plates 64. Other suitable means for limiting the angle of tilt will be apparent to those skilled in the art.

FIG. 7 may also be used to illustrate the use of the present invention in a SALM. In a SALM, middle section 60 would correspond to the riser pipe and, accordingly, would be quite long. Lower section 16 would correspond to the base of the SALM upper section 14 to the buoy. The direction of tilt for the upper flex joint would typically be the reverse of the direction of tilt for the lower flex joint, as is well known in the art.

Figure 8:
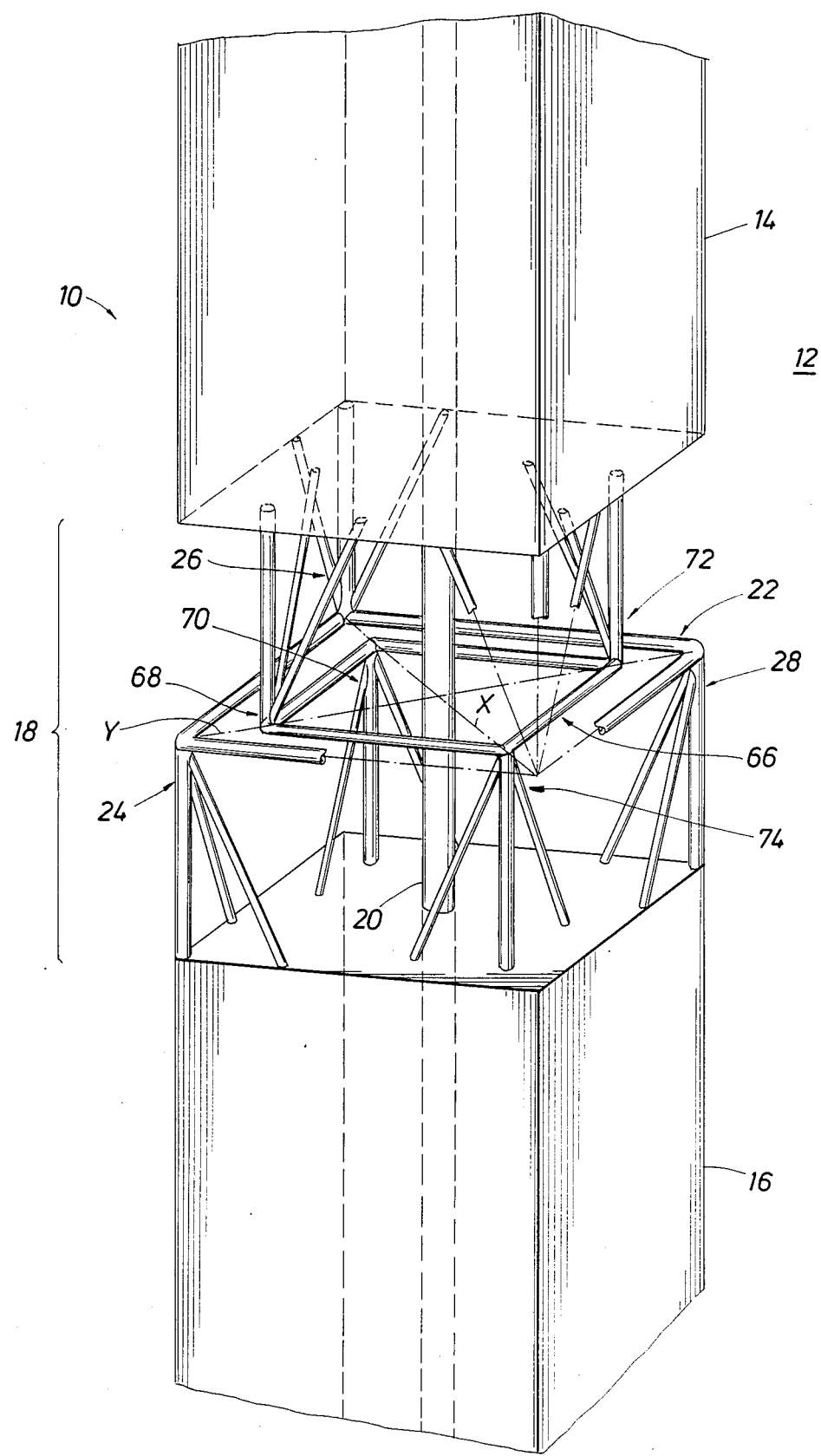
FIG. 8 is a perspective view illustrating an embodiment of the present invention which uses a redundant shear and torsion frame.

FIG. 8 illustrates an embodiment of the invention in which the flex joint 18 includes a second redundant shear and torsion frame 66 and its four support members 68, 70, 72, and 74. For clarity, support member 30 and one corner of frame 22 have been deleted and replaced by dashed lines. As illustrated, redundant frame 66 is square in shape. The length of each of the side members of redundant frame 66 is shorter than the length of the side members of frame 22. Redundant frame 66 is located inside frame 22 and lies substantially in the same plane as frame 22. Preferably, the geometric centers of redundant frame 66 and frame 22 are substantially coincident. Redundant frame 66 is connected to upper section 14 and lower section 16 in the same manner as frame 22. Support members 68, 70, 72, and 74 are preferably located on the same diametral lines as support members 24, 26, 28, and 30; however, the direction of support at each connection point is opposite to the direction of support at the corresponding connection point on frame 22. Thus, support members 68 and 72 are located on diametral line "Y" and are connected to upper section 14, and support members 70 and 74 are located on diametral line "X" and are connected to lower section 16. Additional redundant shear and torsion frames may be used, if desired, with the third frame having support directions corresponding to the first frame, the fourth frame having support directions corresponding to the second frame, and so on.

Figure 10:
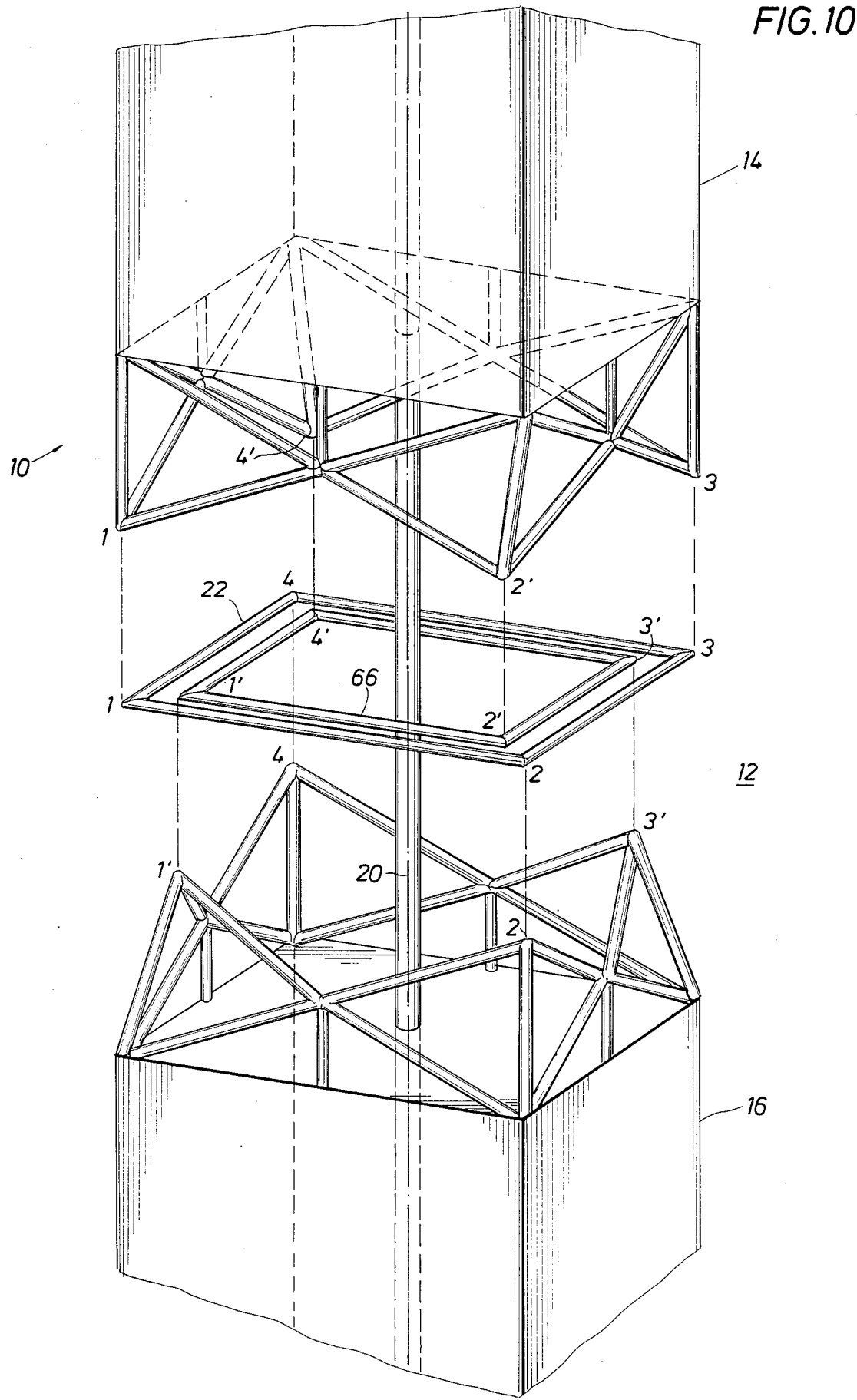

The embodiment of the invention illustrated in FIG. 10 is functionally equivalent to the embodiment previously described in connection with FIG. 8. However, as illustrated in FIG. 10, frame 22 and redundant frame 66 are connected directly to the trussing of upper section 14 and lower section 16. For convenience, the four corners of frame 22 are numbered 1 through 4 and the corresponding corners of redundant frame 66 are numbered 1' through 4'. As illustrated by the dashed lines, corners 1 and 3 on frame 22 are connected to points 1 and 3 on upper section 14 and corners 2 and 4 on frame 22 are connected to points 2 and 4 on lower section 16. Similarly, corners 1' and 3' on redundant frame 66 are connected to points 1' and 3' on lower section 16 and corners 2' and 4' on redundant frame 66 are connected to points 2' and 4' on upper section 14. In order to provide the necessary clearance between frame 22 and redundant frame 66, the trussing of upper section 14 is slanted inwardly a small amount at points 2' and 4'. Similarly, the trussing of lower section 16 is slanted inwardly a small amount at points 1' and 3'. Thus, it can be seen that in the embodiment illustrated in FIG. 10, separate and discrete support members are not used. Rather, frame and redundant frame 66 are connected directly to the trussing of upper section 14 and lower ssection 16. Similar modifications may be made in each of the other embodiments of the invention described herein.

As described above, the flex joint of the present invention overcomes all of the deficiencies inherent in the mechanical pivots previously proposed for use in articulated offshore structures. Other advantages will be readily apparent to those skilled in the art. For example, the flex joint provides ample space for the passage of flowlines, well conductors, and other vertical members through the joint. One of the primary problems in constructing a SALM is passage of multiple flowlines through the articulated joints. The flex joint of the present invention solves this problem.

It should be understood that the invention is not to be unduly limited to the foregoing which has been set forth for illustrative purposes. Various modifications and alterations of the invention will be apparent to those skilled in the art without departing from the true scope of the invention, as defined in the following claims.

What we claim is:

1. A flex joint for use in an articulated structure having first and second sections located generally along a longitudinal axis of said structure, said flex joint adapted to permit said first section to pivot laterally with respect to said second section in respnse to transverse loads, said flex joint comprising:
   an axial load member attached to both said first and second sections and adapted to transmit axial loads therebetween; and
   shear and torsion means for transmitting shear and torsion loads between said first and second sections, said shear and torsion means having at least three elongated shear and torsion links located between said first and second sections and oriented so as to be substantially in a plane perpendicular to said longitudinal axis of said structure, each of said links having a first end connected to said first section and a second end connected to said second section,
   said axial load member and said shear and torsion links adapted to accommodate lateral pivoting of said first section through elastic bending.

2. The flex joint of claim 1 wherein said axial load member comprises an elongated member located substantially coincident with said longitudinal axis.

3. The flex joint of claim 2 wherein said elongated member comprises a single tubular element.

4. The flex joint of claim 2 wherein said elongated member comprises a plurality of concentric tubular elements, each of which is attached to both said first and second sections.

5. The flex joint of claim 2, said flex joint further comprising at least one guide member attached to each of said first and second sections and wherein said elongated member extends through and is guided by said guide members.

6. The flex joint of claim 1 wherein said axial load member comprises a plurality of elongated members grouped in a closely-spaced cluster around and substantially parallel to said longitudinal axis, each of said elongated members being attached to both said first and second sections.

7. The flex joint of claim 1 wherein said shear and torsion means has four elongated shear and torsion links joined in end-to-end relation so as to form a substantially planar shear and torsion frame, said frame being attached to said first section at the opposite ends of a first diametral line lying in the plane of said frame and to said second section at the opposite ends of a second diametral line lying in the plane of said frame, said first and second diametral lines being substantially mutually perpendicular.

8. A flex joint for use in an articulated offshore structure having upper and lower sections located generally along a substantially vertical axis of said structure, said flex joint adapted to permit said upper section to pivot laterally with respect to said lower section in response to transverse loads, said flex joint comprising:

an axial load member attached to both said upper and lower sections and adapted to transmit axial loads therebetween; and shear and torsion means for transmitting shear and torsion loads between said upper and lower sections, said shear and torsion means having at least four elongated shear and torsion links joined in end-to-end relation to form a substantially planar shear and torsion frame located between said upper and lower sections and oriented so as to lie in a plane substantially perpendicular to said substantially vertical axis of said structure, said frame being attached to said upper section at the opposite ends of a first diametral line lying in the plane of said frame and to said lower section at the opposite ends of a second diametral line lying in the plane of said frame, said axial load member and said shear and torsion links adapted to accommodate lateral pivoting of said upper section through elastic bending.

9. The flex joint of claim 8 wherein the geometric center of said frame is located at or near said axis of said structure, and wherein said first and second diametral lines are substantially mutually perpendicular.

10. The flex joint of claim 9 wherein said shear and torsion frame is square in shape and wherein said first and second diametral lines are diagonals of said frame.

11. The flex joint of claim 8 wherein said axial load member comprises an elongated member located substantially coincident with said axis of said structure.

12. The flex joint of claim 11 wherein said elongated member comprises a single tubular element.

13. The flex joint of claim 11 wherein said elongated member comprises a plurality of concentric tubular elements, each of which is attached to both said upper and lower sections.

14. The flex joint of claim 11, said flex joint further comprising at least one guide member attached to each of said upper and lower sections, and wherein said elongated member extends through and is guided by said guide members.

15. The flex joint of claim 8 wherein said axial load member comprises a plurality of elongated members grouped in a closely-spaced cluster around and substantially parallel to said axis of said structure, each of said elongated members being attached to both said upper and lower sections.

16. An articulated offshore structure having a substantially vertical axis, said structure comprising:
    (a) upper and lower sections located generally along said substantially vertical axis of said structure; and
    (b) a flex joint located between and connecting said upper and lower sections, said flex joint adapted to permit said upper section to pivot laterally with respect to said lower section in response to transverse loads, said flex joint having,
        (1) an axial load member attached to both said upper and lower sections and adapted to transmit axial loads therebetween, and
        (2) shear and torsion means for transmitting shear and torsion loads between said upper and lower sections, said shear and torsion means having at least three elongated shear and torsion links oriented so as to lie substantially in a plane perpendicular to said substantially vertical axis, each of said shear and torsion links having a first end attached to said upper section and a second end attached to said lower section, said axial load member and said shear and torsion links adapted to accommodate lateral pivoting of said upper section through elastic bending.

17. The articulated offshore structure of claim 16 wherein said shear and torsion means has four elongated shear and torsion links joined in end-to-end relation so as to form a substantially planar shear and torsion frame, said frame being attached to said upper section at the opposite ends of a first diametral line lying in the plane of said frame and to said lower section at the opposite ends of a second diametral line lying in the plane of said frame.

18. The articulated offshore structure of claim 17 wherein said first and second diametral lines are substantially mutually perpendicular.

19. The articulated offshore structure of claim 17 wherein said shear and torsion frame is substantially square in shape and wherein said first and second diametral lines are diagonals of said frame.

20. The articulated offshore structure of claim 16 wherein said axial load member comprises an elongated member located substantially coincident with said substantially vertical axis of said structure.

21. The articulated offshore structure of claim 20 wherein said elongated member comprises a single tubular element.

22. The articulated offshore structure of claim 20 wherein said elongated member comprises a plurality of concentric tubular elements, each of which is attached to both said upper and lower sections.

23. The articulated offshore structure of claim 20, said structure further comprising at least one guide member attached to each of said upper and lower sections, and wherein said elongated member extends through and is guided by said guide members.

24. The articulated offshore structure of claim 16 wherein said axial load member comprises a plurality of elongated members grouped in a closely-spaced cluster around and substantially parallel to said substantially vertical axis of said structure, each of said elongated members being attached to both said upper and lower sections.

25. An articulated offshore structure having a substantially vertical axis, said structure comprising:

(a) upper and lower sections located generally along said substantially vertical axis of said structure; and
(b) a flex joint located between and connecting said upper and lower sections, said flex joint adapted to permit said upper section to pivot laterally with respect to said lower section in response to transverse loads, said flex joint having,
   (1) an axial load member attached to both said upper and lower sections and adapted to transmit axial loads therebetween, and
   (2) shear and torsion means for transmitting shear and torsion loads between said upper and lower sections, said shear and torsion means having at least four elongated shear and torsion links joined in end-to-end relation to form a substantially planar shear and torsion frame oriented so as to lie substantially in a plane perpendicular to said substantially vertical axis of said structure, said frame being attached to said upper section at the opposite ends of a first diametral line lying in the plane of said frame and to said lower section at the opposite ends of a second diametral line lying in the plane of said frame,
   said axial load member and said shear and torsion links adapted to accommodate lateral pivoting of said upper section through elastic bending.

26. The articulated offshore structure of claim 25 wherein said first and second diametral lines are substantially mutually perpendicular.

27. The articulated offshore structure of claim 25 wherein said shear and torsion frame is substantially square in shape and wherein said first and second diametral lines are diagonals of said frame.

28. The articulated offshore structure of claim 25 wherein said axial load member comprises an elongated member located substantially coincident with said substantially vertical axis of said structure.

29. The articulated offshore structure of claim 28 wherein said elongated member comprises a single tubular element.

30. The articulated offshore structure of claim 28 wherein said elongated member comprises a plurality of concentric tubular elements, each of which is attached to both said upper and lower sections.

31. The articulated offshore structure of claim 28, said structure further comprising at least one guide member attached to each of said upper and lower sections, and wherein said elongated member extends through and is guided by said guide members.

32. The articulated offshore structure of claim 25 wherein said axial load member comprises a plurality of elongated members grouped in a closely-spaced cluster around and substantially parallel to said substantially vertical axis of said structure, each of said elongated members being attached to both said upper and lower sections.

33. An articulated offshore structure having a substantially vertical axis, said structure comprising:
(a) upper and lower sections located generally along said substantially vertical axis of said structure; and
(b) a flex joint located between and connecting said upper lower sections, said flex joint adapted to permit said upper section to pivot laterally with respect to said lower section in response to transverse loads, said flex joint having,
   (1) an axial load member attached to both said upper and lower sections and adapted to transmit axial loads therebetween, and
   (2) shear and torsion means for transmitting shear and torsion loads between said upper and lower sections, said shear and torsion means having
      (i) a substantially planar primary shear and torsion frame oriented so as to lie in a plane perpendicular to said substantially vertical axis of said structure, said primary frame being attached to said upper section at the opposite ends of a first diametral line lying in the plane of said primary frame and to said lower section at the opposite ends of a second diametral line lying in the plane of said primary frame, and
      (ii) a substantaill planar redundant shear and torsion frame oriented so as to lie substantially in the same plane as said primary frame, said redundant frame being attached to said upper section at the opposite ends of a third diametral line lying in the plane of said redundant frame and to said lower section at the opposite ends of a fourth diametral line lying in the plane of said redundant frame,
   said axial load member and said primary and redundant shear and torsion frames adapted to accommodate lateral pivoting of said upper section through elastic bending.

34. The articulated offshore structure of claim 33 wherein the geometric centers of said primary and redundant frames are substantially coincident and are located at or near said substantially vertical axis of said structure.

35. The articulated offshore structure of claim 33 wherein said first and second diametral lines are substantially mutually perpendicular, and wherein said third and fourth diametral lines are substantially mutually perpendicular.

36. The articulated offshore structure of claim 35 wherein said first and fourth diametral lines are substantially coincident and said second and third diametral lines are substantially coincident.

37. The articulated offshore structure of claim 35 wherein said primary and redundant frames are square in shape and wherein said first and second diametral lines are diagonals of said primary frame and said third and fourth diametral lines are diagonals of said redundant frame.

38. The articulated offshore structure of claim 33 wherein said axial load member comprises an elongated member located substantially coincident with said substantially vertical axis of said structure.

39. The articulated offshore structure of claim 38 wherein said elongated member comprises a single tubular element.

40. The articulated offshore structure of claim 38 wherein said elongated member comprises a plurality of concentric tubular elements, each of which is attached to both said upper and lower sections.

41. The articulated offshore structure of claim 38, said structure further comprising at least one guide member attached to each of said upper and second lower sections, and wherein said elongated member extends through and is guided by said guide members.

42. The articulated offshore structure of claim 33 wherein said axial load member comprises a plurality of elongated members grouped in a closely-spaced cluster around and substantially parallel to said substantially vertical axis of said structure, each of said elongated members being attached to both said upper and lower sections.

43. An articulated offshore structure for use in a body of water having a surface and a floor, said structure having a substantially vertical axis and comprising:
  (a) a lower section, an upper section, and one or more intermediate sections located along said substantially vertical axis and extending from said floor of said body of water to a point located at or above said surface of said body of water; and
  (b) a flex joint located between and connecting each adjacent pair of sections of said structure, each said flex joint adapted to permit said adjacent pair of sections to pivot laterally with respect to each other in response to transverse loads, each said flex joint having,
    (1) an axial load member attached to both of said adjacent pair of sections and adapted to transmit axial loads therebetween, and
    (2) shear and torsion means for transmitting shear and torsion loads between said adjacent pair of sections, said shear and torsion means having at least three elongated shear and torsion links oriented so as to lie substantially in a plane perpendicular to said substantially vertical axis, each of said shear and torsion links having a first end attached to one of said adjacent pair of sections and a second end attached to the other of said adjacent pair of sections,
    (3) said axial load member and said shear and torsion links adapted to accommodate lateral pivoting of said adjacent pair of sections through elastic bending.

44. The articulated offshore structure of claim 43 wherein each said shear and torsion means has at least four elongated shear and torsion links joined in end-to-end relation so as to form a substantially planar shear and torsion frame, said frame being attached to one of said adjacent pair of sections at the opposite ends of a first diameteral line lying in the plane of said frame and to the other of said adjacent pair of sections at the opposite ends of a second diametral line lying in the plane of said frame.

* * * * *